United States Patent [19]

Periou et al.

[11] Patent Number: 5,486,724
[45] Date of Patent: Jan. 23, 1996

[54] SYSTEM FOR CONTROL OF ACTUATORS AND SWITCHES BY A REMOTELY LOCATED MICROCONTROLLER USING A TWO BUSS SYSTEM

[75] Inventors: Pierre Periou, Cergy Pontoise; Xavier Bonnefond, Paris, both of France; Dennis A. Kramer, Troy; Mark E. Malinowski, Farmington Hills, both of Mich.

[73] Assignee: Rockwell International Corporation, Pittsburgh, Pa.

[21] Appl. No.: 822,186

[22] Filed: Jan. 15, 1992

[51] Int. Cl.[6] .................................................. G05D 3/00
[52] U.S. Cl. .................................. 307/10.1; 340/825.69; 364/424.05
[58] Field of Search .................. 340/825.69, 825.72, 340/825.54; 49/280; 360–363; 364/424.05; 180/271; 361/154, 160; 307/10.1

[56] References Cited

U.S. PATENT DOCUMENTS 4,845,708  7/1989  Herrmann, Jr. et al. ............... 370/85
5,081,586  1/1992  Barthel et al. ...................... 364/424.05
5,140,316  8/1992  Deland et al. ...................... 340/825.69

*Primary Examiner*—Peter S. Wong
*Assistant Examiner*—Aditya Krishman

[57] ABSTRACT

A two buss system to accomplish; 1) communication from contact pairs located at vehicle access points such as a vehicle door or trunk to a central controller; and 2) transmitting current for energization of actuators to implement respective commands such as normal lock or super lock. The contact pairs function to provide entry ports for commands as well as providing status signals of various points of interest. The contact pairs are connected to individual output ports of a counter. Each contact pair is sequentially pulsed by a single pulse of a pulse train provided by the central controller. If a contact pair is engaged or closed when pulsed, the pulse will cause a coincident buss loading to occur. The central controller monitors buss loading and is appraised of the contact status by the coincidence (or lack thereof) of a pulse and a respectively loaded buss. Upon determination of the contact statuses, the central controller accesses a look-up table and then implements the respective commands by energizing one of several relays that define path for flow of current to respective actuators.

24 Claims, 2 Drawing Sheets

| MODE / RELAY | K1 | K2 | K3 |
|---|---|---|---|
| STANDBY | 0 | 0 | 0 |
| CONTACT PAIR 26 NORMAL LOCK | 0 | 0 | 1 |
| CONTACT PAIR 28 SUPER LOCK | 1 | 0 | 1 |
| CONTACT PAIR 30 UNLOCK | 0 | 1 | 0 |

SYSTEM FOR CONTROL OF ACTUATORS AND SWITCHES BY A REMOTELY LOCATED MICROCONTROLLER USING A TWO BUSS SYSTEM

BACKGROUND OF THE INVENTION

1. Field of the Invention

This invention relates to a system for controlling actuators using contacts having a remotely located controller and, more particularly, to a system incorporating a minimum number of wires for controlling actuators using contacts having a remotely located controller.

2. Description of the Prior Art

Automobiles incorporate several contact pairs in the operation of vehicle doors. These contact pairs function as entry stations for commands to accomplish vehicle locking, unlocking, in addition to providing status information such as door ajar. These contact pairs communicate information to a remotely located controller. A conventional wiring harness interconnecting the contact pairs and controller requires a dedicated wire for each contact pair plus a common wire. As a result, substantial cost and weight is associated with the respective wiring harness. A reduction in weight may be accomplished by implementing a system incorporating a multiplexing concept in which each contact pair is connected through a common buss to the central controller. In such a multiplexing system each contact pair is provided with a module which generates a uniquely signatured signal which is then transmitted to the controller. The signal is then correlated by the controller to a respective command which the controller then implements by energizing actuators using a second buss. Such a system results in a reduction in vviring harness cost and weight but requires a substantial investment in the hardware necessary to produce the uniquely signatured signal. Therefore there is a need to develop a low-cost, minimum weight system for controlling actuators using contacts having a remotely located controller.

SUMMARY OF THE PRESENT INVENTION

The present invention utilizes a two buss system to accomplish; 1) communication from contact pairs located at vehicle access points such as a vehicle door or trunk to a central controller; and 2) transmitting current for energization of actuators to implement respective commands such as normal lock or super lock. The contact pairs function to provide entry ports for commands as well as providing status signals of various points of interest. The contact pairs are connected to individual output ports of a counter. Each contact pair is sequentially pulsed by a single pulse of a pulse train provided by the central controller. If a contact pair is engaged or closed when pulsed, the pulse will cause a coincident buss loading to occur. The central controller monitors buss loading and is appraised of the contact status by the coincidence (or lack thereof) of a pulse and a respectively loaded buss. Upon determination of the contact statuses, the central controller accesses a lookup table and then implements the respective commands by energizing one of several relays that define path for flow of current to respective actuators.

The preferred embodiment of the present invention contemplates a vehicular actuator interface circuit for coupling at least one electromechanical actuator and at least one switching mechanism to a controller of the type which controls application of operating power to the actuator in response to changes in state of the switching mechanism comprising a periodic signal having a cycle including a low and high condition generated by said controller and communicated to the switching mechanism by the interface circuit, the switching mechanism includes means for loading the interface circuit in response to changes in state of the switching mechanism and the controller including means to detect a coincidence of a high condition of the periodic signal and loading of the interface circuit to thereby determine the state of the switching mechanism and supplying power to the actuator in response to changes in state of the switching mechanisms. The switching mechanisms and actuators may be located in the door of the vehicle and the controller may be located on the body portion of the vehicle. Another embodiment of the present invention contemplates a vehicular actuator interface circuit for coupling at least one electromechanical actuator and at least one switching mechanism to a controller of the type which controls application of operating power to the actuator in response to changes in state of the switching mechanism comprising a periodic signal having a cycle including a low and high condition generated by the controller and communicated to the switching mechanism by the interface circuit. The switching mechanism comprises a counter having plurality of outputs wherein each of the outputs is connected to a switch. Each switch includes means for loading the interface circuit and the controller includes means to detect a coincidence of the high condition and loading of the circuit means to thereby determine the state of the switching mechanism and supplying power to the actuator in response to changes in state of the switching mechanisms. These and other aspects of the present invention will become more readily apparent by reference to the following detailed description of the embodiments as shown in the drawings.

DETAILED DESCRIPTION OF THE PREFERRED EMBODIMENT

Figures 1, 2:
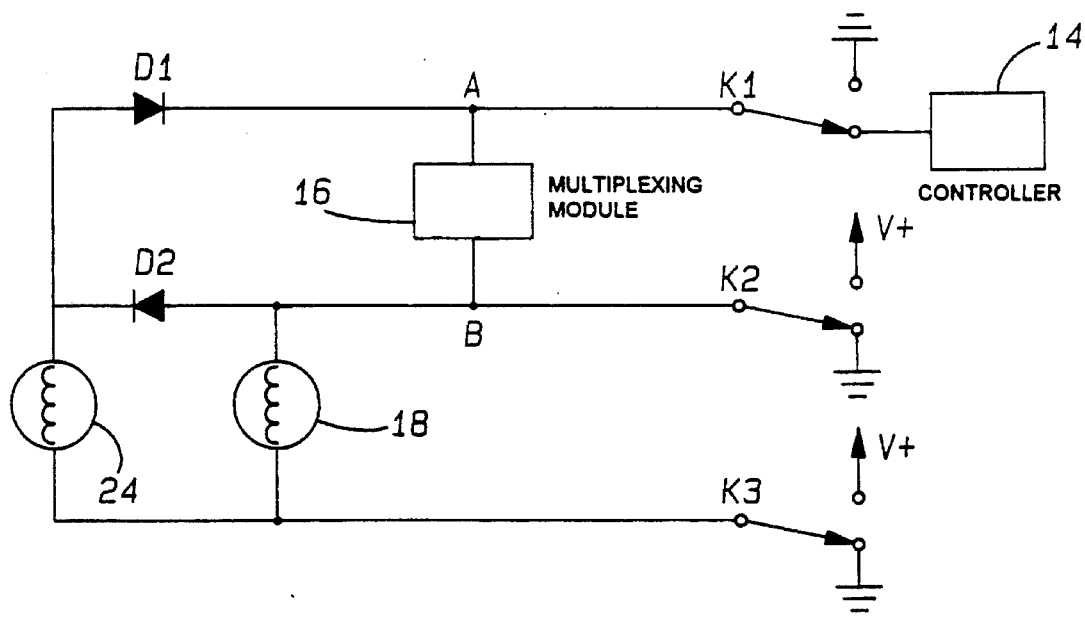
FIG. 1 is a schematic representation of the circuitry of the preferred embodiment of the present invention.
FIG. 2 is a table delineating the mode of operation and respective relay positions.
Figure 3:
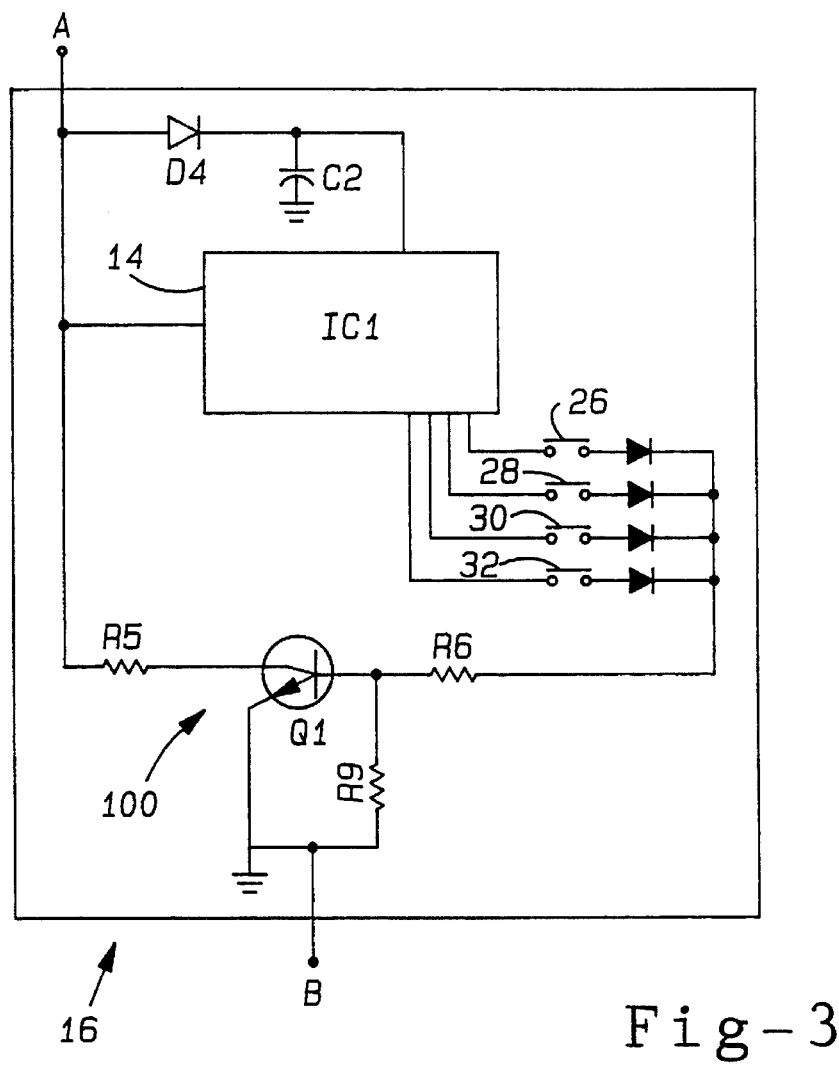
FIG. 3 is an illustration of the circuit as required to accomplish the preferred embodiment of the present invention.

The present invention, as illustrated in FIG. 1, comprises three portions; door portion 10, body portion 12 and central controller portion 14. Multiplexing module 16 respectively functions as an entry port for commands such as lock/unlock as well as providing status signals such as door ajar. The door portion 10 includes actuators to position the mechanical door locking mechanisms in the respective desired mode, i. e., normal lock is accomplished by energizing actuator 18 and super lock is accomplished by energizing actuators 18 and 24. Super lock is a locking mode in which the normal lock function is overridden thereby preventing operation of individual locks to provide access to the vehicle. For example, in a normal lock mode if a window is broken, the sill button can be lifted permitting vehicle access; in super lock mode sill button operation will not permit vehicle access. Diodes D1 and D2 function to achieve a desired flow of current through the circuit to accomplish the various modes of operation. Body portion 12 includes relays K1, K2 and K3 having switchable contacts with normal positions as shown. Central controller portion 14 typically includes a microprocessor. The preferred embodiment includes a Motorola Controller MC68HC05C8. In the preferred embodiment of the present invention, as shown in FIG. 3, contact pairs 26, 28, 30 and 32 are used to connect respective output ports of counter IC1 to buss loading circuit 100. Buss loading circuit 100 includes switchable transistor Q1 which is biased to conducting mode upon receipt of a clock pulse transmitted through any of parallel contacts 26, 28, 30 and 32. One skilled in the art will recognize that IC1 has no external supply of power. Power is provided to IC1 through D4 and C2 which are connected to buss A. Thus, the present invention only requires two wires, not three to operate the multiplex module 16.

Figure 4:
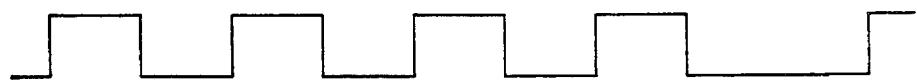
FIG. 4 is an illustration of the pulse train of the present invention.

In operation, central controller 14 produces a digital pulse train, shown in FIG. 4, which typically includes one pulse per contact pair. That is, if 4 contact pairs are used, a pulse train having 4 clock pulses of 0.15 ms duration spaced by 0.15 ms is provided. An off time of 3.5 ms will be provided between each pulse train to reset counter IC. The pulse train is transmitted on buss A. Counter IC1, Motorola MC14017 decade counter sequentially distributes a single clock pulse to each of IC1 outputs and the respectively connected contact pairs. If a contact pair is engaged and conducting, the clock pulse will bias Q1 causing buss A to be connected to ground through resistor R5 and buss B. In this manner buss A is loaded for the duration of the respective clock pulse. Central Controller 14 will detect the coincident clock pulse and buss loading condition and update the status condition of the respective contact pair. Normal lock command is generated when contact 26 is closed; super lock command is generated when contact 28 is closed; unlock command is generated when contact 30 is closed; and door ajar command is provided when door ajar switch 32 is closed. Upon detection of respective contact status, central controller 14 energizes relays K1, K2 and K3 according to the table of FIG. 2 to implement the respective commands.

FIG. 1 illustrates the normal position of switchable contacts for relays K1, K2 and K3. When a combination of contact pair positions is produced which correlate to a command to implement normal lock mode, central controller 16 will energize relay K3. Energizing K3 causes current to flow through normal lock actuator 18 to provide actuation thereof. If a super lock command is generated, K1 and K3 are energized. In this mode of operation current passes through normal lock actuator 18 and super lock actuator 24 to accomplish super lock mode of operation. While in the normal lock or super lock mode of operation, an unlock command is accomplished by energizing K2 thereby returning normal lock actuator 18 and super lock actuator 24 to the normal position.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A vehicular actuator interface circuit for coupling at least one electromechanical actuator and at least one switching mechanism to a controller of the type which controls application of operating power to the actuator in response to changes in state of said switching mechanism, comprising:

a periodic signal having a cycle including a low and a high condition, said periodic signal generated by said controller and communicated to said switching mechanism by said interface circuit;

said switching mechanism including means for loading said interface circuit in response to changes in state of said switching mechanism; and said controller including means to detect a coincidence of said high condition of said periodic signal and loading of said interface circuit to thereby determine the state of said switching mechanism and supplying power to said actuator in response to changes in state of said switching mechanism.

2. The circuit of claim 1 wherein said switching mechanism is disposed on the door of the vehicle.

3. The circuit of claim 1 wherein said actuator is disposed on the door of the vehicle.

4. The circuit of claim 1 wherein said switching mechanism and said actuator are disposed on the door of the vehicle.

5. The circuit of claim 1 wherein said switching mechanism comprises a counter having a plurality of outputs, each of said outputs is connected to a switch, and said counter distributes a cycle of said periodic signal to each switch.

6. The circuit of claim 1 further including a logic gating circuit comprising a plurality of bi-stable means operated in said controller.

7. The circuit of claim 6 wherein said bi-stable means comprises relays.

8. The circuit of claim 6 wherein said logic gating circuit defines an actuation mode in which power is supplied to said actuator and current is not supplied to said switching mechanism.

9. The circuit of claim 6 wherein said logic gating circuit defines a communication mode in which switching signals are communicated between said controller and said switching mechanism.

10. The circuit of claim 6 wherein said logic gating circuit defines a first actuation mode in which power is supplied to said actuator at a first polarity and a second actuation mode in which power is supplied to said actuator at a second polarity.

11. The circuit of claim 6 further comprising a first actuator and a second actuator and wherein said logic gating circuit defines a first actuation mode in which power is supplied to said first actuator and a second actuation mode in which power is supplied to said second actuator.

12. The circuit of claim 6 further comprising a first actuator and a second actuator and wherein said logic gating circuit defines a first actuation mode in which power is supplied to said first actuator at first polarity, a second actuation mode in which power is supplied to said second actuator at said first polarity, a third actuation mode in which power is supplied to said first and second actuator at second polarity.

13. A vehicular actuator interface circuit for coupling at least one electromechanical actuator and at least one switching mechanism to a controller of the type which controls application of operating power to the actuator in response to changes in state of said switching mechanism, comprising:

a periodic signal having a cycle including a low and a high condition, said periodic signal generated by said controller and communicated to said switching mechanism by said interface circuit;

said switching mechanism comprises a counter having a plurality of outputs and each of said outputs is connected to a switch;

said counter distributes a cycle of said periodic signal to each switch;

each said switch including means for loading said interface circuit; and said controller including means to detect a coincidence of said high condition of said periodic signal and loading of said interface circuit to thereby determine the state of said switching mechanism and supplying power to said actuator in response to changes in state of said switching mechanism.

14. The circuit of claim 13 wherein said switching mechanism is disposed on the door of the vehicle.

15. The circuit of claim 13 wherein said actuator is disposed on the door of the vehicle.

16. The circuit of claim 13 wherein said switching mechanism and said actuator are disposed on the door of the vehicle.

17. The circuit of claim 13 further including a logic gating circuit comprising a plurality of bi-stable means operated in said controller.

18. The circuit of claim 12 wherein said bi-stable means comprises relays.

19. The circuit of claim 17 wherein said logic gating circuit defines an actuation mode in which power is supplied to said actuator and current is not supplied to said switching mechanism.

20. The circuit of claim 17 wherein said logic gating circuit defines a communication mode in which switching signals are communicated between said controller and said switching mechanism.

21. The circuit of claim 17 wherein said logic gating circuit defines a first actuation mode in which power is supplied to said actuator at a first polarity and a second actuation mode in which power is supplied to said actuator at a second polarity.

22. The circuit of claim 17 further comprising a first actuator and a second actuator and wherein said logic gating circuit defines a first actuation mode in which power is supplied to said first actuator and a second actuation mode in which power is supplied to said second actuator.

23. The circuit of claim 17 further comprising a first actuator and a second actuator and wherein said logic gating circuit defines a first actuation mode in which power is supplied to said first actuator at first polarity, a second actuation mode in which power is supplied to said second actuator at said first polarity, a third actuation mode in which power is supplied to said first and second actuator at second polarity.

24. A two-bus system for controlling an electromagnetic vehicular actuator, the system comprising:

means for generating a periodic signal on a first bus, the periodic signal having a high condition and a low condition;

means for receiving the periodic signal and generating a status signal indicating the state of a switching mechanism;

means for receiving the status signal and loading a second bus in response thereto; and means for detecting the coincidence of the high condition of the periodic signal and the loading of the second bus and generating an actuator control signal in response thereto, wherein the actuator control signal generated depends on the state of the switching mechanism as indicated by the status signal.

* * * * *